United States Patent [19]

Fernandez

[11] Patent Number: 4,479,825
[45] Date of Patent: * Oct. 30, 1984

[54] GELLED NONPIGMENTED WOOD STAINS

[75] Inventor: Julio A. Fernandez, Ontario, Canada

[73] Assignee: National Starch and Chemical Corp., Bridgewater, N.J.

[ * ] Notice: The portion of the term of this patent subsequent to Feb. 5, 1997 has been disclaimed.

[21] Appl. No.: 494,238

[22] Filed: May 13, 1983

[51] Int. Cl.³ .............................................. C09K 3/00
[52] U.S. Cl. ......................................... 106/34; 8/402
[58] Field of Search ....................... 106/34; 8/402, 611

[56] References Cited

U.S. PATENT DOCUMENTS 2,161,503  6/1939  Bush ..................................... 106/34
4,187,072  2/1980  Fernandez ............................... 8/6.5

Primary Examiner—Paul Lieberman
Assistant Examiner—Amelia B. Yarbrough
Attorney, Agent, or Firm—Edwin M. Szala; Ellen T. Dec

[57] ABSTRACT

Nonpigmented gelled wood stains are prepared from aniline dyestuffs, a solvent other than benzyl alcohol and dibenzylidene sorbitol as gellant therefor.

5 Claims, No Drawings

GELLED NONPIGMENTED WOOD STAINS

BACKGROUND OF THE INVENTION

1. Field of the Invention

This invention relates to nonpigmented wood stains. More particularly, the invention relates to nonpigmented stains which are in gelled form.

2. Brief Description of the Prior Art

Stains for wood have conventionally been available in four forms: Pigment in oil, dye solutions—which utilize water as the solvent, dye solutions in which the solvents are petroleum hydrocarbons, and dye solutions which utilize aliphatic alcohols such as methyl, ethyl and isopropyl as the solvents singly or in combinations with one or more such alcohols and/or glycol ethers such as Cellosolve [Trade Mark of Union Carbide].

Pigmented stains are only suitable for staining either low density open grain woods or rough woods. Such stains depend on the fiber structure of the wood being sufficiently open to allow the pigment particles to lodge. Where such is not possible as is the case with smooth sanded tight grained woods such as maple, the stain cannot be applied by the wipe on method but has be be laid on in the way of a paint in which case the opacity of the pigment greatly detracts from the overall appearance of the wood surface. Furthermore, it becomes substantially more difficult to attain a furniture finish of factory quality, due to uneveness of brush application.

Stains consisting of dye solutions which utilize water as a solvent have good colour and are suitable on high density smooth woods; however, the water present in these stains raises the grain of the wood thereby necessitating addition sanding operation and may even result in the warping of thinner woods.

Stains consisting of dye solutions which utilize petroleum hydrocarbons as solvents, while not having the drawbacks of the aforementioned stains, have another drawback which is their tendency to bleed into the varnishes which are applied as top coats whenever these varnishes contain hydrocarbon solvents which are also capable of dissolving the dyes. Since the great majority of varnishes or wood top coats used by the public are of this type, such stains are not commonly available for home use.

Stains consisting of dye solutions which utilize aliphatic alcohols and/or glycol ether solvents as already mentioned do not have the draw backs of the previous three kinds of stains already mentioned, but present the home user or craftsman with problems of a different kind. The major problem in this respect is the difficulty of applying them evenly due to the extremely fast evaporation of the solvent, so that the only way to apply them uniformly is by spraying, a technique which requires equipment and skills not ordinarily available to the home user or craftsman with problems of a different kind. The major problem in this respect is the difficulty of applying them evenly due to the extremely fast evaporation of the solvent, so that the only way to apply them uniformly is by spraying, a technique which requires equipment and skills not ordinarily available to the home refinisher or small scale industrial contractor.

(1) With the exception of the dye in water system, the other three contain toxic and/or flammable solvents providing yet another drawback to their use.

(2) Thus, of the above four systems only the pigment in oil stains have wide spread use in spite of their limitations, because they are easily used.

SUMMARY

This same inventor has disclosed in his earlier U.S. Pat. No. 4,197,072 issued June 16, 1979, that novel stains could be provided from a dyestuff, dibenzylidene sorbitol and benzyl alcohol or a mixture of benzyl alcohol with Cellosolve (trademark of Union Carbide).

I have found that solvents other than benzyl alcohol can be used to achieve similar properties provided the solvent is capable of dissolving the dyestuff and is compatible with the dibenzylidene sorbitol gellant as well as any other additives conventionally used.

Thus, in accordance with one aspect of the invention, there is provided, a gelled nonpigmented wood stain composition comprising:

(a) from 0.3 to 10% by weight of at least one soluble aniline dye;
(b) from 0.5 to 6% of dibenzylidene sorbitol; and
(c) the remainder of the composition comprising a suitable solvent selected from the group consisting of cyclohexanol, methyl benzyl alcohol, beta-phenethyl alcohol and n-methylcyclohexanol.

In accordance with the second aspect of the invention, there is provided, a process for staining wood comprising applying thereto a gelled nonpigmented wood stain composition comprising:

(a) from 0.3 to 10% by weight of at least one soluble aniline dye;
(b) from 0.5 to 6% of dibenzylidene sorbitol; and
(c) the remainder of the composition comprising a suitable solvent selected from the group consisting of cyclohexanol, methyl benzyl alcohol, beta-phenethyl alcohol and n-methylcyclohexanol.

The dibenzylidene sorbitol may have a gel strength within the range of $1 \times 10^6$ to $10 \times 10^6$ cps (preferably about $7 \times 10^6$ cps). Preferably, the dye may be present in an amount of about 3 to about 8% by weight.

The resultant stain is in a gelled semi-solid form and may be readily applied by brushing or wiping to any type of wood surface to produce a clear, transparent stained finish. The gelled stain is relatively slow in penetrating the wood and in drying so it may be applied to large surfaces and shaded as desired with no detectable unevenness or lap marks. Moreover, the gelled nature of the stain composition avoids many of the problems normally associated with dye containing stains such as spillage, necessity of carefully covering all working areas, etc.

An added advantage of wood surfaces stained with the stains here described is that they may be topcoated with such conventional materials as alkyl and urethane oil varnishes. Many of the stains used in prior art compositions either interfered with the adhesion of topcoats or were formulated with materials which caused the dyestuff to redissolve in the hydrocarbon solvent used in such topcoats.

Additionally, the stain may be applied over previously stained and varnished surfaces in order to deepen the tone thereof without necessitating the removal of the varnish and without detracting from the appearance of the natural wood grain.

DETAILED DESCRIPTION OF PREFERRED EMBODIMENTS OF THE INVENTION

Any of the conventional spirit soluble aniline dyes, (also known as coal tar dye stains) may be used in the present stain formulations. The most commonly employed of such dyes include the following: Walnut R, Golden Oak, Bismarch Brown, Black Nigrosine W.N., Green MX Crystals, Methylene Blue 2B, Fuchine Magenta R.T. and Violet 3BPN. These dyes are generally available under the Neozapon and Orasol tradenames from Badische Aniline and Soda-Fabrik and Ciba-Giegy respectively. Blends of one or more of the above with other benzyl alcohol soluble dyes may also be used. The total amount of dye employed will generally be within the range of 0.3 to 10%, preferably 3 to 8% by weight of the total formulation.

The exact chemical structure of the dibenzylidene sorbitol used as a gellant here is not known with certainty; it is, however, believed to be amixture comprising a major proportion of dibenzylidene sorbitol with minor amounts of monobenzylidene sorbitol and tribenzylidene sorbitol. It may be prepared, for example, by adding benzaldehyde to an aqueous solution of sorbitol in an amount of 1 to 3 moles benzaldehyde per mole sorbitol. The reaction is carried out under acidic conditions whereby the pH is maintained at about 1 by the addition of, for example, sulfuric or phosphoric acid and the temperature at about 25° C. by cooling. The solid product is separated by filtration from the washed reaction mixture, washed with water and dried. Other methods of preparation will be apparent to those skilled in the art. Alternatively dibenzylidene sorbitol is supplied by New Japan Chemical Company under the tradename Gel All-D. The gellant is employed in quantities sufficient to produce a composition having a gel strength (measured on a Brookfield Helipath H) within the range of $1 \times 10^6$ to $10 \times 10^6$ cps., preferably about $7 \times 10^6$ cps., an optimum gel strength and viscosity for easy spreading and clean shipping and handling. The amount of gellant required to produce such viscosity will generally range from 0.5 to 6% by weight, preferaly about 3.5% depending on such factors as the particular dyestuff employed, and solids concentration, etc.

The remainder of the composition is the solvent. Any solvent capable of dissolving the particular dye components employed and being compatible with the gellant may be used in these systems, however it is most desirable to choose a solvent which is slow drying, has low toxicity and does not have an offensive odor. For the reasons outlined above, preferred solvents include cyclohexanol, beta-phenethyl alcohol, n-methylcyclohexanol and methyl benzyl alcohol. Additionally, other additives conventionally employed in stain formulations (e.g. waxes) may also be added to the present compositions.

A composition also may be prepared from the gellant and the solvent. Such a composition is useful as a cleaner, or alternatively as a primer or as a shading compound. Thus, after application of the stain, the final tone may be lightened or further shaded by application of the gelled solvent. Alternatively, in the case where the end grain of the wood will be exposed (e.g. in raised panels on doors or intricately carbed surfaces) it has been found that application of the gelled solvent on such surfaces as a primer prior to staining will result in a uniform tone on all surfaces of the wood in contrast to the deeper stained tones normally present on such end grains.

The novel stain compositions here described are readily prepared by adding the desired amount of the gelling agent to a solution of the particular dye in the solvent. In the most convenient method of preparation, the mixture is heated to effect solution and then naturally or force-cooled to gel. Alternatively, other methods for dispersing the mixture and forming the gel may be employed. If the heating method is used to produce the gel, the mixture may be packaged in the liquid form and allowed to gel in the particular packaging container. In this form, the stain may be stored for an indefinite period with no particular storage conditions required.

In order to apply, the gelled stain may be brushed or wiped onto the desired wood surface which has been preferably first treated with Danish Oil or othe primer, shaded as desired and allowed to dry. Drying times on the order of about 4 to 7 hours should be allowed prior to any subsequent treatment of the surface, such as by top-coating.

In the following example, all parts are by weight and all temperatures in degrees Celsius unless otherwise noted.

EXAMPLE I

This example illustrates the preparation of a gelled non-pigmented wood stain according to the present invention.

A dyestuff may be prepared by combining 7.78 parts Neozapon Green 36, 5.78 parts Orasol Red 2BL, 8.67 parts Neozapon Orange RE and 2.77 parts Orasol Black CN. This dye is then dissolved in 463.5 parts methyl benzyl alcohol and 11 parts dibenzylidene sorbitol (Gel All-D) added thereto. The mixture is heated to about 80° C. over a period of about 20 mins. poured into 16 oz. metal containers, covered and allowed to cool to room temperature. The resultant product will have a viscosity of about $7 \times 10^6$ cps. and produce a uniform, stain when applied to maple, oak, white ash and pine panels which has first been treated with a Danish Oil primer coating.

In a similar manner, additional gelled stain formulations can be prepared by replacing the methyl benzyl alcohol with cyclohexanol, n-methyl cyclohexanol and beta-phenethyl alcohol.

What is claimed is:

1. A gelled nonpigmented wood stain composition comprising:
   (a) from 0.3 to 10% by weight of at least one soluble aniline dye;
   (b) from 0.5 to 6% of dibenzylidene sorbitol; and
   (c) the remainder of the composition comprising a suitable solvent selected from the group consisting of cyclohexanol, methyl benzyl alcohol, beta-phenethyl alcohol and n-methylcyclohexanol.

2. The composition of claim 1 wherein the dye is present in an amount of 3 to 8% by weight.

3. The composition of claim 1 wherein the dibenzylidene sorbitol is present in an amount sufficient to produce a composition having a gel strength within the range of $1 \times 10^6$ to $10 \times 10^6$ cps.

4. The composition of claim 1 wherein the dibenzylidene sorbitol is present in an amount sufficient to produce a composition having a gel strength of about $7 \times 10^6$ cps.

5. A process for staining wood comprising applying thereto a gelled nonpigmented wood stain composition comprising:
   (a) from 0.3 to 10% by weight of at least one soluble aniline dye;
   (b) from 0.5 to 6% of dibenzylidene sorbitol; and
   (c) the remainder of the composition comprising a suitable solvent selected from the group consisting of cyclohexanol, methyl benzyl alcohol, beta-phenethyl alcohol and n-methylcyclohexanol.

* * * * *